(12) United States Patent
Daya

(10) Patent No.: US 8,078,624 B2
(45) Date of Patent: Dec. 13, 2011

(54) CONTENT SEARCHING FOR PORTALS HAVING SECURE CONTENT

(75) Inventor: Shahir A Daya, North York (CA)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 11/961,318

(22) Filed: Dec. 20, 2007

(65) Prior Publication Data

US 2009/0164447 A1    Jun. 25, 2009

(51) Int. Cl.
*G06F 7/02* (2006.01)
*G06F 17/21* (2006.01)
(52) U.S. Cl. .................................. 707/741; 707/784
(58) Field of Classification Search ....... 707/9, 999.009, 707/722, 741, 784
See application file for complete search history.

(56) References Cited

U.S. PATENT DOCUMENTS

| 5,881,225 | A | 3/1999 | Worth |
| 6,412,073 | B1 | 6/2002 | Rangan |
| 2006/0080316 | A1* | 4/2006 | Gilmore et al. .................. 707/9 |
| 2007/0078705 | A1 | 4/2007 | Abels et al. |
| 2009/0112868 | A1* | 4/2009 | Rajamani et al. ................ 707/9 |

* cited by examiner

*Primary Examiner* — James Trujillo
*Assistant Examiner* — Bruce Moser
(74) *Attorney, Agent, or Firm* — Law Offices of Ira D. Blecker, P.C.

(57) ABSTRACT

Searching content of a portal. The portal includes at least one portal page having a plurality of portal content elements at least one of which is a secure portal content element wherein each of the portal content elements is a portion of a portal page. Each secure portal content element is associated with a unique identifier, wherein the unique identifier is a uniform resource locator and is different than a uniform resource locator for the portal page. Each secure portal content element is indexed by a keyword. Search parameters and credentials are received from a user, and a preliminary result set satisfying the search parameters is generated. For each secure portal content element in the preliminary result set, the credentials and the unique identifier are used to determine whether the user is permitted to access that secure portal content element. The preliminary result set is used to generate a final result set. A result identification is presented to the user, identifying the secure portal content elements that are included in the final result set and which the user is permitted to access, with such secure portal content elements being distinguished from any secure portal content elements to which the user is denied access.

20 Claims, 7 Drawing Sheets

| ENTITY | CREDENTIALS | URL REQUESTED | CONTENT RETURNED | |
|---|---|---|---|---|
| | | CRAWL TIME | | |
| Search Engine | All Access | http://host/portalpage?c=A | • HTTP status code 200 OK<br>• Secure Portal Content Element A | ← 802<br>← 804 |
| Search Engine | All Access | http://host/portalpage?c=B | • HTTP status code 200 OK<br>• Secure Portal Content Element B | |
| | | SERVE TIME | | |
| User A<br>(Member of Group A) | User A | http://host/portalpage?c=A<br>- or -<br>http://host/portalpage?c=B | • HTTP status code 200 OK<br>• Secure Portal Content Element A | ← 806<br>← 808 |
| Search Engine | User A | http://host/portalpage?c=A | • HTTP status code 200 OK<br>• Secure Portal Content Element A | ← 810 |
| Search Engine | User A | http://host/portalpage?c=B | • HTTP status code 401 UNAUTHORIZED | ← 812 |
| User B<br>(Member of Group B) | User B | http://host/portalpage?c=A<br>- or -<br>http://host/portalpage?c=B | • HTTP status code 200 OK<br>• Secure Portal Content Element B | ← 814 |
| Search Engine | User B | http://host/portalpage?c=A | • HTTP status code 401 UNAUTHORIZED | ← 816 |
| Search Engine | User B | http://host/portalpage?c=B | • HTTP status code 200 OK<br>• Secure Portal Content Element B | ← 818 |
| User C<br>(Member of Group A<br>and Group B) | User C | http://host/portalpage?c=A<br>- or -<br>http://host/portalpage?c=B | • HTTP status code 200 OK<br>• Secure Portal Content Element A<br>• Secure Portal Content Element B | ← 820 |
| Search Engine | User C | http://host/portalpage?c=A | • HTTP status code 200 OK<br>• Secure Portal Content Element A | ← 822 |
| Search Engine | User C | http://host/portalpage?c=B | • HTTP status code 200 OK<br>• Secure Portal Content Element B | ← 824 |
| User D<br>(Member of neither Group A<br>nor Group B) | User D | http://host/portalpage?c=A<br>- or -<br>http://host/portalpage?c=B | • HTTP status code 401 UNAUTHORIZED<br>[Page showing access was denied] | ← 826 |
| Search Engine | User D | http://host/portalpage?c=A | • HTTP status code 401 UNAUTHORIZED | ← 828 |
| Search Engine | User D | http://host/portalpage?c=B | • HTTP status code 401 UNAUTHORIZED | |

Figure 8

CONTENT SEARCHING FOR PORTALS HAVING SECURE CONTENT

FIELD OF THE INVENTION

The present invention relates to content searching, and more particularly to content searching for portals having secure portal content elements.

BACKGROUND OF THE INVENTION

Portals are used to aggregate content, such as applications and web pages (or portions of web pages). Thus, a portal page may appear to a user as a single web page, when in fact it is an aggregation of different portal content elements, with a first part of the portal page displaying a first portal content element, a second part of the portal page displaying a second portal content element, and so on. For example, published U.S. Patent Application No. 20070078705 describes a system for screening and filtering e-commerce content, using a portal to present the data.

In many web-based applications, security protocols are important. For example, U.S. Pat. No. 5,881,225 discloses a role-based authorization system for controlling access to certain functions in a computer system. Portals are no exception to the requirement for security, and portals therefore frequently implement security and authorization protocols to control which users will have access to which content elements. U.S. Pat. No. 6,412,073 discloses a portal which aggregates and presents links to secure websites, and also stores and manages login and password information so that when a user selects one of the links, the user can access the content without having to log in manually.

Like other web pages, a portal is typically accessed through a network, including but not limited to the Internet, by means of a single, unique uniform resource locator (URL). When any particular user accesses the portal using the portal's unique URL, the portal page that is returned will only include those portal content elements that the user is permitted to view based on his or her authorization (typically a user ID and a password), although all such elements will typically be included. For example, a user who is a member of Group 1 may be permitted to view all content within the portal, but a user who is a member of Group 2 may only be permitted to view certain portal content elements. This can create problems when using a search engine to search for content in portals.

SUMMARY OF THE INVENTION

In one aspect, the present invention is directed to a method for searching content of a portal. The portal is provided and comprises at least one portal page having a plurality of portal content elements at least one of which is a secure portal content element wherein each of the portal content elements is a portion of a portal page. Each secure portal content element is associated with a unique identifier, wherein the unique identifier is a uniform resource locator and is different than a uniform resource locator for the portal page. Each secure portal content element is indexed by a keyword. Search parameters and credentials are received from a user. A preliminary result set satisfying the search parameters and including at least one of the secure portal content elements indexed by keyword and associated with the unique identifier is generated. For each secure portal content element included in the preliminary result set, the credentials and the unique identifier for that secure portal content element are used to determine whether the user is permitted to access that secure portal content element. Responsive to determining, for each secure portal content element included in the preliminary result set, whether the user is permitted to access that secure portal content element, the preliminary result set is used to generate a final result set satisfying the search criteria and including at least one secure portal content element. A result identification is presented to the user, identifying the secure portal content elements that are included in the final result set and which the user is permitted to access, in which all secure portal content elements that are included in the final result set and which the user is permitted to access are distinguished from any secure portal content elements that are included in the final result set and to which the user is denied access.

In one embodiment, the only secure portal content elements that are identified by the result identification set are those which the user is permitted to access. In one particular adaptation of the above embodiment, the final result set excludes any members of the preliminary result set to which the user is denied access, and the result identification identifies all members of the final result set.

In another embodiment, the result identification comprises a first identifiable subset identifying all secure portal content elements that are included in the final result set and which the user is permitted to access, and a second identifiable subset that identifies all secure portal elements that are included in the final result set and to which the user is denied access. In one particular implementation of this embodiment, members of each subset are identified by flagging. In another implementation of this embodiment, each subset is presented to the user as a single result group.

In one embodiment, the unique identifier is a uniform resource locator.

In one embodiment, responsive to a selection by the user of a secure portal content element in the final result set, a portal page with which the selected secure portal content element is associated is presented to the user, wherein the portal page includes all portal content elements for that portal page that the user is permitted to access.

In other aspects, the present invention is directed to a data processing system and to a computer program product for implementing the above-described methods.

BRIEF DESCRIPTION OF THE DRAWING FIGURES

FIG. 8 is a table showing exemplary results of certain exemplary requests, in accordance with an embodiment of an aspect of the present invention.

DETAILED DESCRIPTION

Figure 1:
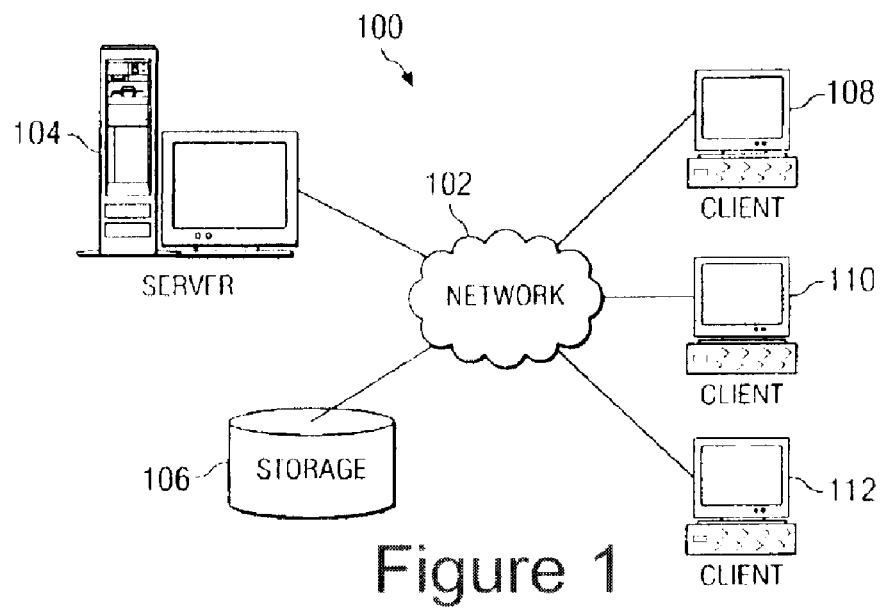
FIG. 1 is an exemplary block diagram of a distributed data processing system in which aspects of the present invention may be implemented.

With reference now to the figures, FIG. 1 depicts a pictorial representation of a network of data processing systems in which aspects of the present invention may be implemented. Network data processing system 100 is a network of computers in which aspects of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for any aspect of the present invention.

Figure 2:
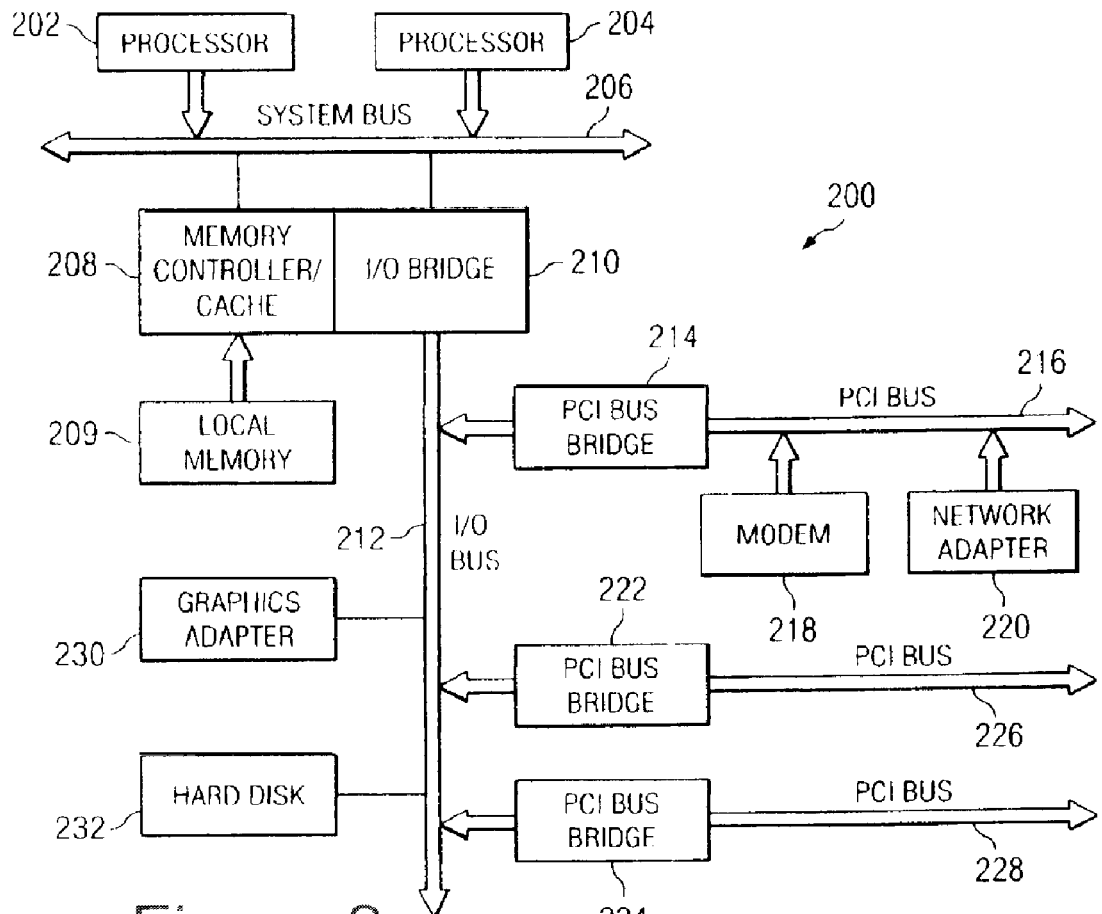
FIG. 2 is an exemplary block diagram of a server computing device in which aspects of the present invention may be implemented.

Referring to FIG. 2, a block diagram of a data processing system that may be implemented as a server, such as server 104 in FIG. 1, is depicted. Data processing system 200 may be a symmetric multiprocessor (SMP) system including a plurality of processors 202 and 204 coupled to system bus 206. Alternatively, a single processor system may be employed. Also coupled to system bus 206 is memory controller/cache 208, which provides an interface to local memory 209. I/O bus bridge 210 is coupled to system bus 206 and provides an interface to I/O bus 212. Memory controller/cache 208 and I/O bus bridge 210 may be integrated as depicted.

Peripheral component interconnect (PCI) bus bridge 214 coupled to I/O bus 212 provides an interface to PCI local bus 216. A number of modems may be coupled to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be coupled to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to any aspect of the present invention.

The data processing system depicted in FIG. 2 may be, for example, an IBM® eServer™ pSeries® system, a product of International Business Machines Corporation in Armonk, N.Y., running the Advanced Interactive Executive (AIX®) operating system or LINUX® operating system. Each of "IBM", "eServer", "pSeries" and "AIX" are trademarks or registered trademarks of International Business Machines Corporation in the United States, other countries, or both. Linux is a registered trademark of Linus Torvalds in the United States, other countries, or both.

Figure 3:
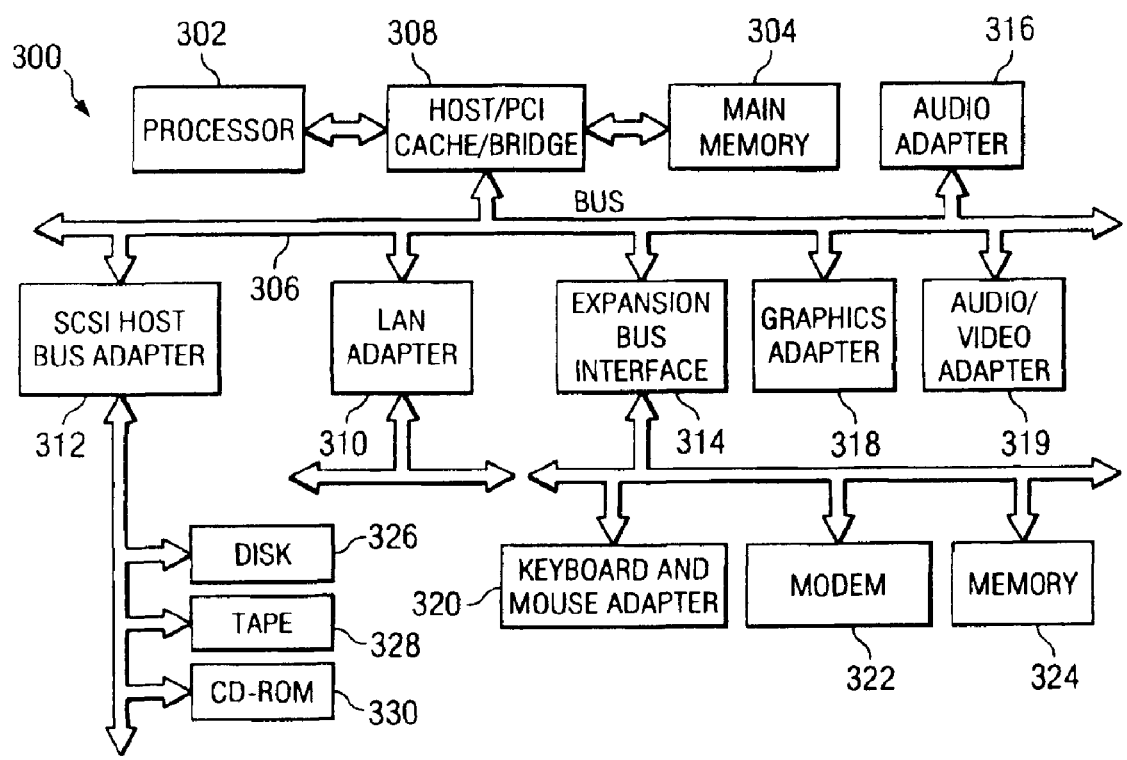
FIG. 3 is an exemplary block diagram of a client computing device in which aspects of the present invention may be implemented.

With reference now to FIG. 3, a block diagram illustrating a data processing system is depicted in which aspects of the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are coupled to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are coupled to PCI local bus 306 by direct component connection. In contrast, audio adapter 316, graphics adapter 318, and audio/video adapter 319 are coupled to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. Microsoft, Windows, Windows XP, and the Windows logo are trademarks of Microsoft Corporation in the United States, other countries, or both. An object oriented programming system such as Java may run in conjunction with the operating system and provide calls to the operating system from Java programs or applications executing on data processing system 300. Java and all Java-based trademarks are trademarks of Sun Microsystems, Inc. in the United States, other countries, or both. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
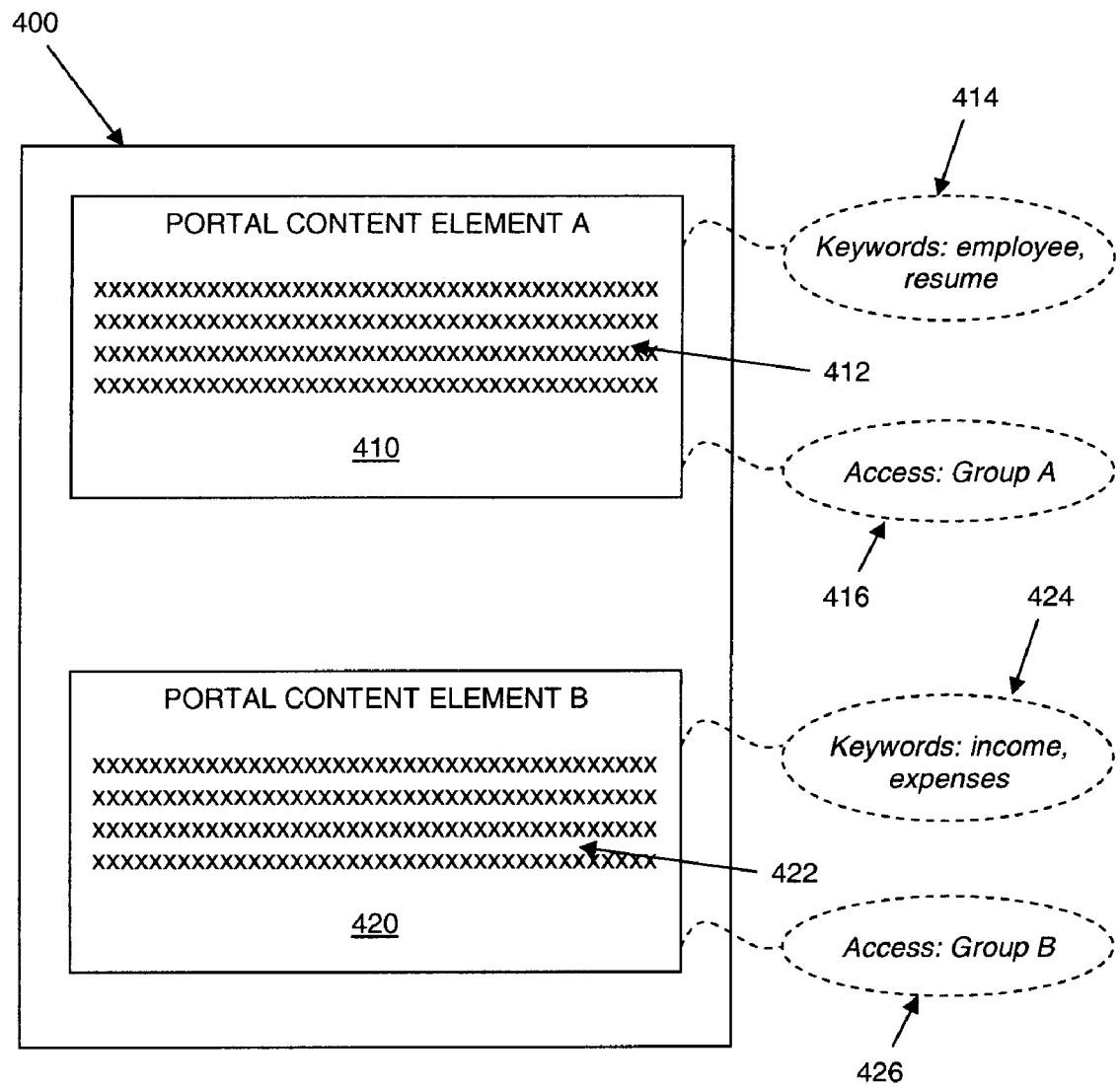
FIG. 4 is an exemplary schematic representation of a portal page of a portal in respect of which aspects of the present invention may be implemented.

With reference now to FIG. 4, an exemplary schematic representation of a portal page is shown generally at 400. A portal typically comprises a plurality of individual portal pages, in a manner analogous to the way that a web site typically comprises a plurality of individual web pages. In the exemplary embodiment shown in FIG. 4, the portal page 400 is directed to providing content related to aspects of a company's business; it will be appreciated that the use of this exemplary content is for illustrative purposes only, and that aspects of the present invention may equally be applied to portals directed to any type of content, or to any combination of types of content.

The portal page 400 comprises a plurality of portal content elements, in this case portal content element A 410, which contains content 412 relating to a company's personnel records, and portal content element B 420, which contains content 422 related to a company's financial data. It will be appreciated that the use of only two portal content elements is for simplicity of illustration only, and that aspects of the present invention may be applied to portal pages having any plural number of portal content elements. Moreover, since a portal may have a plurality of individual portal pages, a portal may comprise a plurality of individual portal content elements spread over one or more individual portal pages, and restriction of the description herein to the single portal page 400 is for ease of illustration only, and is not intended to imply any limitation on the scope of the present invention.

Portal content element A 410 has associated therewith keywords 414, namely "employee" and "resume", and portal content element B 420 has associated therewith keywords 424, namely "income" and "expense". Keywords 414 and 424 will form part of a content index for the content in portal content elements A 410 and B 420, which content index may be generated by a search engine crawler or by a feed to the search engine from the web server hosting the portal 400. It will be appreciated that FIG. 4 is a schematic representation, and that portal content elements presented as part of a portal page will generally not present their keywords directly to users; rather the keywords are typically stored in an index that is generally provided by the server that maintains the portal, and maintained by the server which hosts the search engine. (In some cases, a search engine may generate additional keywords as part of the crawling process; these additional keywords may also be associated with the portal content elements.)

Portal content element A 410 and portal content element B 420 are both secure portal content elements. As used herein, "secure" means, in the context of a portal content element, that there is some type of restriction on access to that portal content element. For example, a user ID or password (or both) may be required to gain access to the content, or access may only be permitted from certain locations or from certain types of computer. Other suitable types of access restrictions, whether now extant or hereinafter developed, may also be employed, without departing from the scope of the present invention.

In the context of the exemplary portal 400 shown in FIG. 4, access to secure portal content element A 410 and secure portal content element B 420 is restricted on the basis of whether the user seeking access is a member of a particular group. Thus, each secure portal content element 410, 420 also has associated therewith respective access restrictions 416, 426. In particular, access restriction 416 limits access to secure portal content element A 410 to members of Group A, while access restriction 426 limits access to secure portal content element B 420 to members of Group B. Thus, an exemplary User A who is a member only of Group A can access secure portal content element A 410 but not secure portal content element B 420, while an exemplary User B who is a member only of Group B can access secure portal content element B 420 but not secure portal content element A 410. An exemplary User C who is a member of both Group A and Group B can access both secure portal content element A 410 and secure portal content element B 420. An exemplary User D who is not a member of either Group A or Group B cannot access any of the content on the portal page 400; that is, User D cannot access either secure portal content element A 410 or secure portal content element B 420.

In the context of the exemplary portal page 400 which provides information about a company's business, the company's human resources personnel might be members of Group A, so as to have access to the personnel-related content in secure portal content element A 410, and the company's accounting personnel might be members of Group B, so as to have access to the financial information content in secure portal content element B 420. The company's senior executives might be members of both Group A and Group B, and therefore would have access to both secure portal content element A 410 and secure portal content element B 420. Members of the company's shipping and receiving department might be members of neither Group A or Group B. It will be appreciated that FIG. 4 is a schematic representation, and that secure portal content elements presented as part of a portal will generally not present their access restrictions to users; rather, such access restrictions will be maintained by the server that hosts the portal.

Although exemplary portal page 400 is shown as having two secure portal content elements 410, 420, a portal in respect of which aspects of the present invention may be applied may include one or more pages and may have only a single secure portal content element or more than two secure portal content elements, and may also include one or more non-secure portal content elements in addition to secure portal content elements.

Search engines typically use a software program (or a component of a software program) called a "crawler" to examine web pages and generate an index of the content in those web pages, and this index is used by the search engine to generate matching search results when a user enters a search query. Where the web pages that are to be "crawled" include content in a portal to which access is restricted, such as the portal page 400, the crawler program can be given a user ID and password which provides access to all of the portal's content so that the crawler can generate an accurate index. Alternatively, such as in instances where it is desirable to avoid giving the crawler unfettered access to the portal content, the system maintaining the portal can send a "feed", i.e. a pre-defined index to the content of the portal, to the search engine for use in handling user queries. When a user enters a search query, the search engine can use the index (whether generated by a crawler or received as a feed) to determine whether any particular content item in the index should be returned as a match or "hit".

A particular difficulty arises when search engines deal with portals having access restrictions, such as the portal of which portal page 400 is a part. Generally, before including a web page in a list of matching search results, a search engine will first check whether the user has access to that web page. Typically, this is done by the search engine trying to access the URL for the web page with the authenticated user's credentials (e.g. user ID and password). If the user is authorized to access the web page, the server hosting the web page will indicate this by returning HTTP Status Code 200 ("OK"), and if the user is not authorized, the server will return HTTP Status Code 401 ("UNAUTHORIZED"). Using these codes, the search engine can determine whether the user is authorized to access any particular URL, and can then omit from the list of search results any web pages having matching content but which the user who entered the search is not authorized to view.

Because a portal page is represented by a single unique URL, the access-checking methodology can only determine whether a user is entitled to access that portal page generally. In particular, if the user has access to any content within the portal page, a request for that portal page's URL will return HTTP Status Code 200 ("OK"), and so conventional access-checking will show a user as authorized if the user has access to any content within the portal page. Thus, where such a portal page contains content matching the search criteria, the portal page URL will be included in the list of search results if the user has access to any content within the portal page. However, because different users may have access to different secure portal content elements, a user who has access to some content in the portal page may not necessarily have access to the particular secure portal content element in which the content matching the search criteria is located. For example, User A who is authorized to access the portal page 400 in FIG. 4 may have access only to secure portal content element A 410, but the content matching User A's search criteria may actually be contained within secure portal content element B 420. Nonetheless, because the URL access check shows that the user has access to the portal page 400 (since User A has access to some of the content in the portal page 400), the portal page 400 would be included in the list of search results. This could create confusion and frustration for User A, because if he or she selected the portal page 400 from the search results, he or she would not be able to see the content that actually satisfied the search criteria, a namely secure portal content element B 420, because the portal security restrictions prevent User A from viewing that content.

Figure 5:
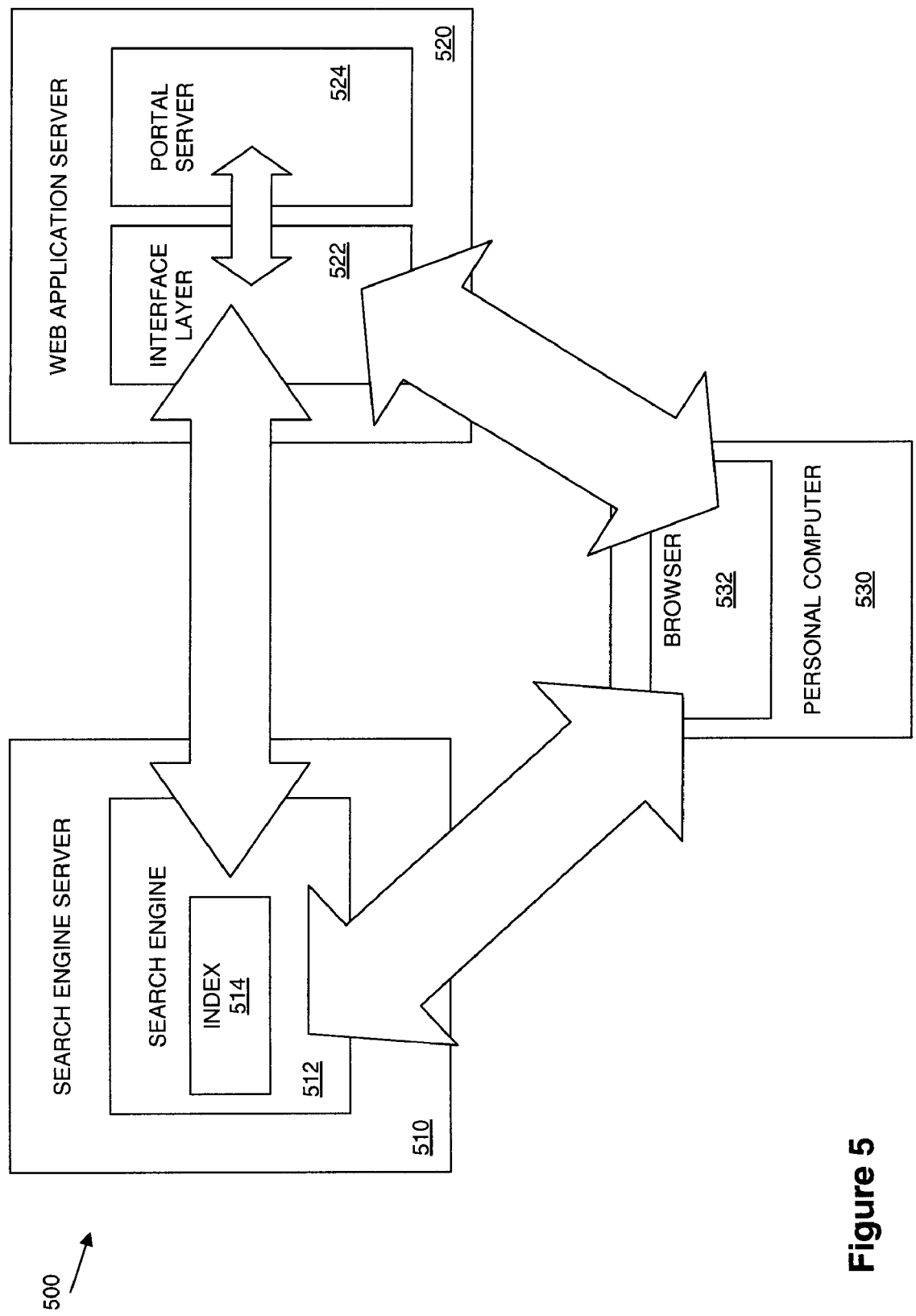
FIG. 5 is a schematic representation of an exemplary arrangement for implementing aspects of the present invention.

With reference now to FIG. 5, a schematic representation of an exemplary arrangement for implementing aspects of the present invention is shown generally at 500. The arrangement 500 comprises a search engine server 510, a web application server 520 and a personal computer 530. The search engine server 510, web application server 520 and personal computer 530 are all able to communicate with one another through a network such as the Internet (not shown). The search engine server 510 and web application server 520 may be, for example, servers such as server 200 in FIG. 2. The search engine server 510 may also be, for example, a Google Search Appliance, and the web application server may also be, for example, a WebSphere® Application Server. WebSphere is a trademark or registered trademark of International Business Machines in the United States, other countries, or both. Although omitted from FIG. 5 for simplicity of illustration, a web application server (such as web application server 520) will typically have a web server (e.g. an HTTP server such as, for example the IBM HTTP Server or the Apache HTTP Server) interposed between the web application server and the network (also not shown in FIG. 5 for simplicity of illustration). The personal computer 530 may be, for example, a computer such as computer 300 in FIG. 3, or may be any other suitable type of personal computing device, including a laptop computer, palmtop computer, a handheld device such as a mobile phone or mobile e-mail device, or a home appliance with Internet connectivity. The personal computer 530 has a web browser 532, which is a software program that allows the personal computer to receive and display web pages, including portal pages such as the portal page 400 in FIG. 4.

The search engine server 510 has a search engine 512. The search engine 512 is a software application that runs on the search engine server 510, and is adapted to receive search parameters and then execute a search procedure to identify content that matches the search parameters. Typically, as noted above, the search engine 512 will maintain an index 514 of keywords for various content items, and will use that index to carry out the search. The index may be a single index or, alternatively, a plurality of indexes may be used. Additionally, the index 514 may indicate, for each content item represented in the index, whether that particular content item is secure.

The web application server 520 hosts a portal, such as the portal that includes the portal page 400 in FIG. 4. The web application server 520 includes an interface layer 522 and a portal server 524. The interface layer 522 is a software program that receives requests from the web browser 532 and the search engine 512, and processes those requests before passing the processed requests to the portal server 524. Similarly, the interface layer 522 receives responses from the portal server 524 and passes those responses on to the search engine 512 or the browser 532, as appropriate. The portal server 524 is a software program that actually hosts a portal, such as the portal that includes the portal page 400, and may be, for example, WebSphere Portal Server.

Figure 6:
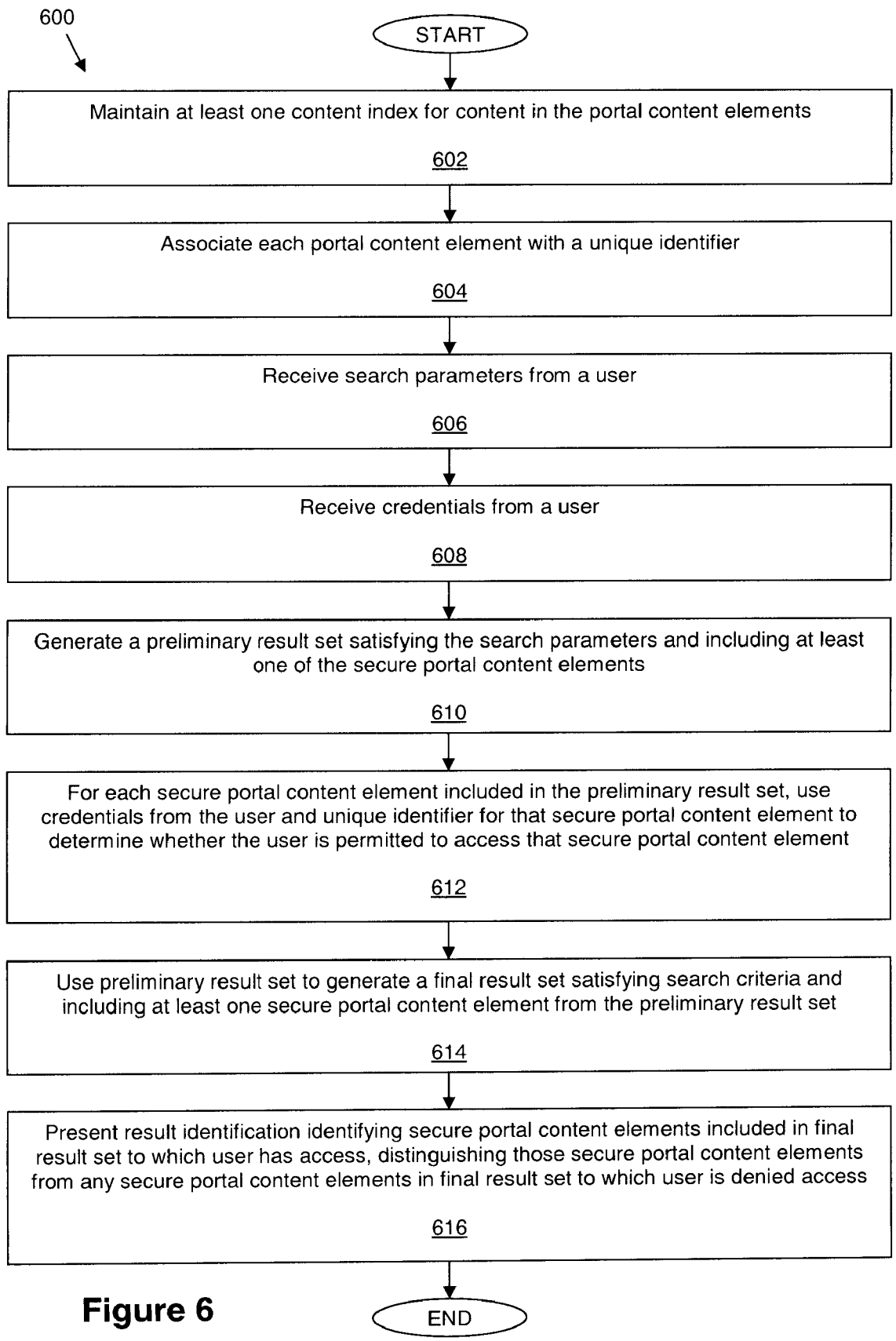
FIG. 6 is a flow chart showing a method for searching content of at least one portal, according to an aspect of the present invention.

With reference now to FIG. 6, a method for searching content of at least one portal, such as an exemplary portal including the exemplary portal page 400, wherein each portal comprises a plurality of portal content elements, such as exemplary portal content elements A 410 and B 420, at least one of which is secure, is shown generally at 600.

At step 602, the method 600 maintains at least one content index (such as index 514 in FIG. 5) for content in the portal content elements. With reference to the exemplary portal 400, the index or indexes would include keywords 414 for secure portal content element A 410, and keywords 424 for secure portal content element B 420.

At step 604, the method 600 associates each secure portal content element with a unique identifier. Thus, with reference to the exemplary portal page 400, portal content element A 410 would be associated with a first unique identifier, and portal content element B 420 would be associated with a second unique identifier. In one embodiment, each unique identifier is a uniform resource locator, as will be explained in greater detail below. It should be noted here that, strictly speaking, it is only necessary to associate each secure portal content element with a unique identifier; it is not necessary to associate non-secure portal content elements, or other non-secure content items, with unique identifiers, although this may optionally be done.

Steps 602 and 604 may be performed in any order, or may be performed in parallel or substantially in parallel, and will typically be performed by a search engine on a search engine server, such as search engine 512 on search engine server 510. Step 604 is typically performed by a search engine server in cooperation with a web application server (such as web application server 520). The effect of steps 602 and 604 is that each individual secure portal content element is treated as a single content item within the index (such as index 514), and is associated with a unique identifier, such as a unique URL, which allows each secure portal content element within a given portal to be distinguished from other secure portal content elements within the same portal. One technique for generating a unique URL for each secure portal content element is to append a query parameter for the particular secure portal content element to the URL for the portal page in which the secure portal content element is presented, thereby generating a new URL. For example, the URL for the portal page 400 in FIG. 4 might be http://host/portalpage, and a query parameter such as "?c=A" or "?c=B" could be appended thereto so that the portion of the index (such as index 514 in FIG. 5) which relates to portal page 400 might be, after execution of steps 602 and 604:

| URL | Keywords | Secure? |
|---|---|---|
| http://host/portalpage?c=A | employee, resume | Yes |
| http://host/portalpage?c=B | income, expenses | Yes |

It will be appreciated that the first entry in the above index portion relates to secure portal content element A 410, and the second entry relates to secure portal content element B 420 (both shown in FIG. 4). In some embodiments, the unique identifiers for each secure portal content element are provided to the search engine by the portal server (such as portal server 524 in FIG. 5) or interface layer (such as interface layer 522 in FIG. 5); in such embodiments the search engine will associate the unique identifiers with their respective secure portal content elements by, for example, recording the associations in the index such as in the exemplary index above. Moreover, in instances where a single secure portal content element may be presented in more than one portal page, one unique identifier can be assigned to that secure portal content element for each portal page in which it may appear. For example, if secure portal content element A 410 appears in two portal pages (not shown), secure portal content element A 410 could be assigned two unique identifiers, such as http://host/portalpage/page1?c=A for the first portal page and http://host/portalpage/page2?c=A for the second portal page. Even though this technique would result in a secure portal content element having more than one URL as an identifier, each such URL is still a unique identifier because each such URL uniquely identifies only secure portal content element A 410, and does not identify any other secure portal elements. Analogous techniques may be employed with identifiers other than URLs.

At step 606, the method 600 receives search parameters from a user. For example, a user may be seeking content which contains certain words, contains certain words and omits others, contains certain words and was generated within a certain time period, and the like. Typically, the search parameters will initially be entered in a browser (such as browser 532 in FIG. 5) on a personal computer (such as personal computer 530 in FIG. 5), and then transmitted by the browser to, and received by, a search engine (such as search engine 512) on a search engine server (such as search engine server 510 in FIG. 5).

At step 608, the method 600 receives credentials from a user. The credentials are those which will determine whether a user has access to various portal content elements, and may include information such as user ID, password, the workstation the user is using, as well as other information that can be used to identify and/or authenticate the user. In the typical case, the user's credentials will initially be entered in a browser (such as browser 532 in FIG. 5) on a personal computer (such as personal computer 530 in FIG. 5), and then transmitted by the browser to, and received by, a search engine (such as search engine 512) on a search engine server (such as search engine server 510 in FIG. 5). The credentials are considered to originate from the user even if they are generated automatically, such as where the credentials include the particular workstation from which a search originates, or where the credentials include biometric or similar information that is gathered and transmitted automatically.

Steps 606 and 608 may be performed in any order, or may be performed simultaneously or substantially simultaneously. Additionally, it is within the contemplation of the inventor that one or both of steps 606 and 608 may in certain circumstances be performed before one or both of steps 602 and 604, although there may be adverse performance effects from so doing. For example, a user's credentials (step 608) and search parameters (step 606) may be sent to a search engine before the search engine has an index to maintain (step 602) and before the search engine has associated the secure portal content elements with unique identifiers (step 604). In such a case, execution of the search, and of the remaining steps of the method 600, could be delayed until the index has been created and the associations have been made, although this would likely result in adverse performance effects. Alternatively, in some embodiments a search engine may use a search technique that does not involve an index; in such embodiments step 602 may be omitted and the secure portal content elements may be associated with their respective unique identifiers by other suitable means.

At step 610, the method 600 generates a preliminary result set satisfying the search parameters and including at least one of the portal content elements. Typically, the index is used to generate the preliminary result set. For example, if a user had searched for "employee", a preliminary result set would include secure portal content element A 410 (along with any other matching portal content elements and web pages) because the search parameters matched the "employee" keyword 414 (FIG. 4) in the index. Step 610 is typically carried out by a search engine (such as search engine 512 in FIG. 5) on a search engine server (such as search engine server 510 in FIG. 5). While an index is typically used, generation of the preliminary result set may be achieved by any suitable technique, whether now extant or hereinafter developed, without departing from the scope of the present invention. For example, and without restricting the generality of the foregoing, in addition to using keywords, a search engine such as search engine 512 may also carry out additional searching or analysis of the text within pages or portal content elements that were initially identified on the basis of keywords, or may use ranking or popularity data. Such additional information may be used, for example, to assist in determining the order in which search results will be presented to a user. If feasible in the circumstances, content may be searched directly without use of an index. In addition, it will be appreciated that the quality of the preliminary result set will depend on the particular search engine, and the search techniques implemented thereby.

At step 612, for each secure portal content element included in the preliminary result set, the method 600 uses the credentials from the user (obtained at step 608) and the unique identifier for that secure portal content element (from step 604) to determine whether the user is permitted to access that particular secure portal content element. It is the unique identifier associated with each secure portal content element that enables a search engine (such as search engine 512 in FIG. 5) implementing the method 600 to make this determination at the level of individual portal content elements, rather than merely determining (by requesting the URL for the portal page generally) whether the user can access at least one (unknown) portal content element in the portal. Accordingly, the search engine will know, for each secure portal content element in the preliminary result set, whether the user who initiated the search is permitted to access that particular secure portal content element, rather than merely knowing whether the user can access some portion of the portal page containing that secure portal content element. By way of example, step 612 enables the search engine to determine, specifically, whether a particular user has access to secure portal content element B 420, rather than knowing only that the user has access to one or both of secure portal content element A 410 or secure portal content element B 420 (and not knowing any additional detail). For example, if the user who had searched for "employee" was User C, then step 612 would determine that User C has access to the specific secure portal content element A 410 since User C is a member of Group A.

Step 612 is typically carried out by a search engine (such as search engine 512 in FIG. 5) on a search engine server (such as search engine server 510 in FIG. 5), by way of the search engine communicating with a web application server (such as web application server 520 in FIG. 5). In some embodiments, as will be explained in greater detail below, the search engine (such as search engine 512 in FIG. 5) communicates with an interface layer (such as interface layer 522) on a web application server (such as web application server 520 in FIG. 5), which in turn communicates with a portal server (such as portal server 524) on that web application server in order to facilitate execution of step 612.

At step 614, responsive to step 612, the method 600 uses the preliminary result set to generate a final result set satisfying the search criteria. The final result set may include not only secure portal content elements to which the user has access, but also secure portal content elements to which the user is denied access In some cases, the final result set may be identical to the preliminary result set, i.e. the preliminary result set simply becomes the final result set without further processing and analysis. In other cases, further processing and analysis may be applied to the preliminary result set in using it to generate the final result set, examples of which are discussed below.

At step 616, the method 600 presents to the user a result identification identifying the secure portal content elements included in the final result set and which the user is permitted to access. Making use of the information obtained at step 612, the result identification will distinguish those secure portal content elements included in the final result set which the user is permitted to access from any secure portal content elements included in the final result set to which the user is denied access. The result identification may be, for example, a list of URLs, such that when a URL for a particular secure portal content element is selected by a user, e.g. by a mouse click, a request for that secure portal content element will be made.

While each secure portal content element is treated as an individual member of the preliminary result set for the purpose of the access determination in step 612 of the method 600, secure portal content elements are preferably treated differently within the final result set. In particular, when a user requests a particular secure portal content element in the final result set (such as by clicking on a hyperlink within the result identification, presented at step 616, to request the unique URL for that individual secure portal content element), the user preferably will not be presented with only the specific secure portal content element requested, but rather will be presented with all portal content (for the portal page of which the requested secure portal content element is a part) that the user is authorized to see. This process will be explained in greater detail below, with respect to FIG. 8. For example, if User C had searched for "employee", the preliminary result set (step 610) would include secure portal content element A 410 because the search parameters matched the "employee" keyword 414 (FIG. 4). Because User C is a member of Group A, User C has access to secure portal content element A 410, so (based on the determination at step 612), if secure portal content element A 410 is included in the final result set, it will be identified to User C (step 616) in such a manner as to be distinguished from any secure portal content elements that were members of the preliminary result set but to which User C is denied access. Were User C to request secure portal content element A 410, User C would be presented with all of the content of portal page 400 that User C is permitted to view, which includes not only secure portal content element A 410, but also (since User C is also a member of Group B) secure portal content element B 420.

As noted above, within the result identification, those secure portal content elements that the user is permitted to access are distinguished from any secure portal content elements in the final result set to which the user is denied access. This distinguishing may be achieved in a variety of ways.

In one embodiment, the only secure portal content elements that are included in the result identification presented to the user are those which the user is permitted to access. Thus, those secure portal content elements would be distinguished by being the only secure content elements in the result identification (i.e. they are distinguished by virtue of their inclusion in the result identification to the exclusion of any secure portal content elements to which the user was denied access).

In one particular adaptation of the above embodiment, the final result set generated at step 614 excludes any members of the preliminary result set to which the user is denied access, and the result identification simply identifies all members of the final result set. In such an embodiment, because the final result set includes only secure portal content elements which the user is permitted to access, a result identification that identifies all the members of the final result set will automatically include only those secure portal content elements in the final result set that the user is permitted to access.

In another embodiment, the result identification presented to the user comprises a first identifiable subset identifying all secure portal content elements in the final result set that the user is permitted to access, and a second identifiable subset that identifies all secure portal content elements that are in the final result set and to which the user is denied access. One method of identifying the subsets is by flagging. For example, the result identification may take the form of a list, and the members of one or both subsets could be associated with an identifier, such as a green circle for those members to which access is permitted and a red circle or red octagon for those members to which access is denied. Alternatively, the subsets may be identified by presenting the first subset to the user as a first result group and presenting the second subset to the user as a second result group. Thus, a first group could be a list of all members of the final result set to which the user has access, and a second group could be a list of all members of the final result set to which the user is denied access. In either of these embodiments, for any given secure portal content element included in the result identification presented to the user, it will be known whether the user has access to the particular secure portal content element that contains the information matching the search criteria.

In certain embodiments, even where the members of the final result set to which the user does not have access are generally included in the result identification presented to the user, a method according to an aspect of the present invention may provide for an override wherein certain results are not displayed. For example, in the context of a corporate network, there might be no reason not to display the titles of secure portal content elements relating to layoffs that have already been announced (e.g. "2006 Layoffs"), even though access to the details has been denied. However, it would typically not be desirable for employees who do not have access to the underlying portal content element to see a listing entitled "20XX Layoffs", where 20XX is the current or an upcoming year.

In addition, a relevance threshold may be applied to the preliminary result set to generate the final result set, or to the result identification that is presented to the user. In the simplest case, the relevance threshold is simply that all secure portal content elements that satisfy the search criteria are included in the final result set. However, in many cases (such as where a search is carried out on the Internet) there may be a high number of results, on the order of thousands or even millions. In such instances, the relevance threshold may be higher, and may be based on additional analysis by a search engine. For example, only the X most relevant results may be included in the final result set or in the result identification (i.e. the search results presented to a user), where X is a whole number, and thus the final result set and/or the result identification presented to the user may not include all of the secure portal content elements that satisfy the search criteria and which the user is entitled to access, but only those which rank above the relevance threshold.

In some instances, one or a few results may be omitted from the final result set or from the result identification presented to the user, for any one of a variety of reasons other than relevance. For example, while the user may have access to a particular secure portal content element, access may be blocked by a firewall (e.g. to prevent employees from accessing inappropriate web sites from a work location).

Figure 7:
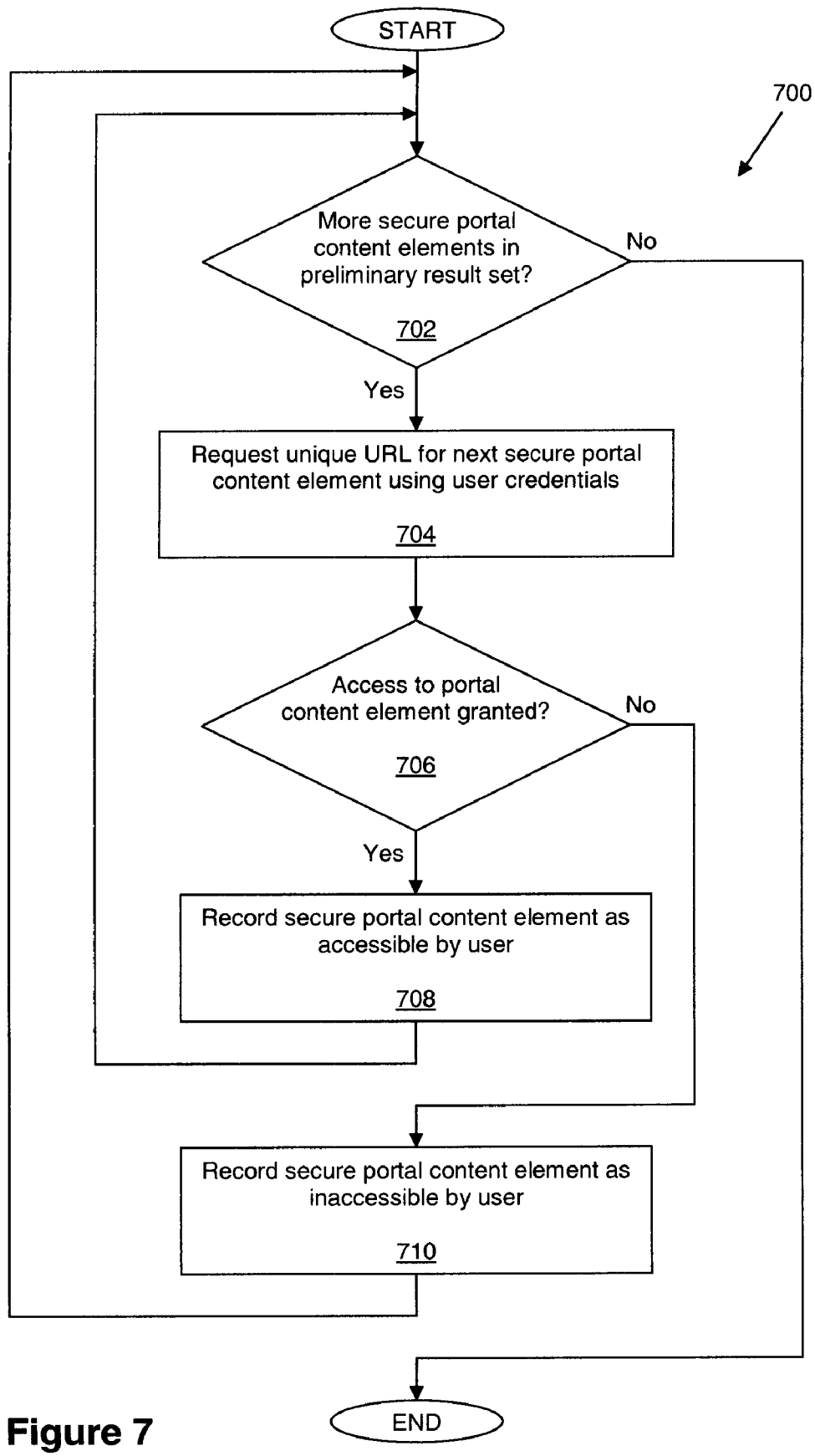
FIG. 7 is a flow chart showing a particular exemplary implementation of a portion of the method depicted in FIG. 6.

With reference now to FIG. 7, an exemplary implementation of a method for using credentials and unique identifiers to determine, for each portal content element included in the preliminary result set, whether the user is permitted to access that portal content element, is shown generally at 700. The method 700 is a particular exemplary implementation of step 612 of the method 600 in which URLs are used as the unique identifiers. Thus, the method 700 begins immediately following step 610 of the method 600 in FIG. 6.

At step 702, the method 700 checks whether there are any additional secure portal content elements in the preliminary result set for which access has not yet been tested. If there are additional secure portal content elements in the preliminary result set for which access has not yet been tested, the method 700 proceeds to step 704. If there are no further secure portal content elements in the preliminary result set for which access has not yet been tested, either because all such secure portal content elements have been tested or because the preliminary result set did not include any secure portal content elements, the method 700 ends (and the method 600 proceeds to step 614).

At step 704, the method 700 requests the unique URL for the next secure portal content element, using the credentials associated with the user who initiated the search. As noted above, the URL for an individual secure portal content element will be different from the URL for the portal page. With reference to the exemplary portal page 400, for example, the URL for the portal page might be http://host/portalpage, while the unique URL for secure portal content element A 410 could be http://host/portalpage?c=A and the unique URL for secure portal content element B 420 could be http://host/portalpage?c=B.

In a typical embodiment, the request at step 704 may be made by a search engine (such as search engine 512 in FIG. 5) to a web application server (such as web application server 520 in FIG. 5). In a particular embodiment, and with reference to FIG. 5, the search engine 512 transmits a request for the particular unique URL, using the user's credentials, to the web application server 520. At the web application server 520, the request from the search engine 512 is received by the interface layer 522, which recognizes that the request is from a search engine by checking the web agent making the request. Because the request is from a search engine and not an individual user, the interface layer 522 communicates with the portal server 524 and uses the user credentials provided by the search engine 512 to request from the portal server 524 the specific secure portal content element with which the unique URL is associated.

At step 706, the method 700 checks whether access to that secure portal content element has been granted. Continuing the description of the exemplary embodiment from step 704, if the user credentials provided by the search engine 512 and communicated by the interface layer 522 to the portal server 524 enable access, then the portal server 524 returns HTTP Status Code 200 ("OK") to the interface layer 522. In turn, the interface layer 522 then returns HTTP Status Code 200 to the search engine 512, enabling the search engine 512 to determine that access to the particular secure portal content element was granted based on the user credentials. In this case, the method 700 proceeds to step 708, at which the secure portal content element is recorded as accessible based on the user credentials. If the user credentials provided by the search engine 512 and communicated by the interface layer 522 to the portal server 524 do not permit access, then the portal server 524 returns HTTP Status Code 401 ("UNAUTHORIZED") to the interface layer 522. The interface layer 522 then returns HTTP Status Code 401 to the search engine 512, which enables the search engine 512 to determine that access to the particular secure portal content element was denied, based on the supplied user credentials. In response to determining that access is denied, the method 700 proceeds to step 710, at which the secure portal content element is recorded as inaccessible by the user and recorded as such. Recording of secure content elements as either accessible (step 708) or inaccessible (step 710) may be by any means known in the art so long as such recording enables secure content elements to which the user has access to be distinguished, at step 616 of the method 600, from those to which the user is denied access. For example, flagging may be used to record which portal content elements are secure portal content elements.

After either of step 708 or step 710, the method 700 returns to step 702 to check whether there are any additional secure portal content elements in the preliminary result set for which access has not yet been tested.

The method 700 leverages the portal server (such as portal server 524) that serves up the content (such as secure portal content elements A 410 and B 420) to determine if the particular secure portal content element is accessible with particular credentials in the same manner in which the user would if they were navigating the portal directly. In an alternative embodiment, the interface layer 522 could query another system that was aware of the content authorization (for example, a content management system that was used to manage the portal content or a content metadata relational database) instead of the portal server.

As noted above, in an implementation of an embodiment where the unique identifier is a URL, the server (such as web application server 520) which hosts the portal could be configured so as to enable the different portal content elements to each be accessed using different URLs, with each such URL returning only the single portal content element with which it is associated if, and only if, a request for that URL is made by a search engine which presents appropriate credentials (i.e. if the user's credentials obtained at step 608 permit access to that particular portal content element).

Accordingly, with reference to FIG. 5, when the search engine 512 sends a request for a unique URL associated with a particular secure portal content element, the request will be received by the interface layer 522 on the web application server 520. The interface layer 522 then processes the request and, using the user credentials included in the request, passes a request to the portal server 524 for only the specific secure portal content element associated with the unique URL. Thus, where a search engine requests a unique URL associated with a particular portal content element, if the credentials presented permit access to that portal content element, then the portal server 524 will return HTTP Status Code 200 ("OK") to the interface layer 522, which then returns HTTP Status Code 200 to the search engine 512. Optionally, the portal server can also return a portal page containing only the specifically requested secure portal content element to the interface layer 522, which would then pass the portal page on to the search engine 512 along with HTTP Status Code 200. Returning a portal page containing only the specifically requested secure portal content element when the request is from a search engine is not necessary where the index is provided in a feed, but allows a search engine to obtain a copy of the secure portal content element to enable generation of an index by crawling, or to enable the search engine to carry out additional analysis of the content, such as to assist in ranking or narrowing down the search results. Thus, a search engine could be provided with "all access" credentials for use in obtaining secure portal content elements at "crawl time" to build an index, but would use a specific user's credentials when making a request at "serve time" as part of step 612 of the method 600. If the credentials presented do not permit access to that secure portal content element, then the portal server 524 will return HTTP Status Code 401 ("UNAUTHORIZED") to the interface layer 522, which then returns HTTP Status Code 401 to the search engine 512. This arrangement enables the search engine to determine which secure portal content elements a particular user is authorized to access, for example by use of the method 700.

If the server (such as web application server 520) hosting the portal were to receive a request for a URL uniquely associated with a particular secure portal content element directly from a user (such as from browser 532) rather than from a search engine, the request is treated differently. A request could originate from a user because, for example, the secure portal content element associated with that URL was included in the final result set (step 614 in of the method 600) and was included in the result identification presented to the user (step 616 of the method 600) and the user requested that secure portal content element. With reference to FIG. 5, when the web browser 532 sends a request for a unique URL associated with a particular secure portal content element, the request will be received by the interface layer 522 on the web application server 520. The interface layer 522 then processes the request. The interface layer 522 recognizes that the request is from a user and, using the user credentials included in the request, passes a request to the portal server 524 for all of the portal content that the user is authorized by his or her credentials to receive. Assuming that the user is authorized to view at least some of the portal page content, then the portal server 524 will return HTTP Status Code 200 ("OK"), along with the portal page containing the requested secure portal content element as well as all of the other secure portal content elements in that page that the user is authorized to view, together with as any non-secure portal content elements, to the interface layer 522. The interface layer 522 then returns HTTP Status Code 200, along with the portal page, to the web browser 532. If the credentials presented do not permit access to any portal content elements on that portal page, then the portal server 524 will return HTTP Status Code 401 ("UNAUTHORIZED"), along with a web page showing that access was denied, to the interface layer 522, which then returns HTTP Status Code 401, along with the web page indicating denial of access, to the web browser 532. Where the above procedure is implemented, a search engine (such as search engine 512 in FIG. 5) that is presenting a result identification can simply present the URL for each particular secure portal content element included in the final result set, since a request by the user for a particular secure portal content element will cause a portal page including that secure portal content element, as well as all other secure portal content elements on that page that the user is entitled to access, to be presented to the user. As noted above, the interface layer 522 can determine whether a request for access to a particular portal content element came from a search engine or from a user by checking the web agent making the request.

Optionally, the search engine can replace URLs that are uniquely associated with particular secure portal content elements with the URLs for the respective portal pages prior to presenting the result identification to the user. In addition, in circumstances where the final result set (or the result identification) would include more than one secure portal content element from the same portal page, the server may optionally aggregate these into a single search result, either in the final result set or in the result identification presented to the user. For example, if a user had searched for "employee & income", a suitably advanced search engine would recognize that secure portal content elements A 410 and B 420, taken together, satisfy the search parameters and should be included in the preliminary result set. Should step 612 of the method 600 show that both of those secure portal content elements are accessible to the user, the URLs for the individual secure portal content elements could be replaced with the single URL for the portal page 400 when generating the final result set (step 614) or when presenting the result identification to the user (step 616).

With reference now to FIG. 8, a table showing the results returned, depending on the entity making the request, the credentials presented, and the particular URL requested, is indicated generally at 800. The table 800 is based on the exemplary portal page 400 in FIG. 4 and the exemplary arrangement shown in FIG. 5 implementing exemplary methods 600 and 700; it will be understood that this is for illustrative purposes only and is not intended to be limiting in any way.

The table 800 distinguishes between crawl time, when the search engine 512 is building the index, and serve time, when (a) the search engine 512 uses the credentials from the user and the unique identifier for a particular secure portal content element (in this case the unique URL) to determine whether the user is permitted to access that secure portal content element; and (b) a user may (via browser 532) request a URL for a secure portal content element included in the final result list. Rows 802 and 804 relate to crawl time, and rows 806 to 828 relate to serve time.

As indicated in the table 800 and as explained in greater detail below, where a user requests a URL corresponding to a particular secure portal content element, the web application server 520 will, via interface layer 522 and portal server 524, return all portal content elements (for the page containing the requested secure content element) that the user's credentials authorize him or her to see, regardless of which particular secure portal content element the user requested (or else indicate that the user is not authorized). In contrast, if the search engine 512 (rather than the user) requests a URL corresponding to a particular secure portal content element, the web application server 520 will, via interface layer 522 and portal server 524, return an HTTP status code indicating whether credentials presented by the search engine show that access to that particular secure portal content element is authorized in respect of those credentials. Optionally, the server maintaining the portal will also return that particular secure portal content element, and the table 800 represents this optional configuration.

At row 802, at crawl time the search engine 512 presents "all access" credentials and requests the URL http://host/portalpage?c=A. The web application server 520 returns HTTP Status Code 200 ("OK") and also returns the secure portal content element A 410 (FIG. 4). Similarly, at row 804, at crawl time the search engine 512 presents "all access" credentials and requests the URL http://host/portalpage?c=B, and the web application server 520 returns HTTP Status Code 200 ("OK"), and also returns the secure portal content element B 420 (FIG. 4). In each case, because the request is from the search engine 512, only the particular secure portal content element that was requested is returned. The "all access" credentials may be used because the search engine 512 is attempting to build an index, and therefore needs to access all of the secure portal content elements in order to index them.

At row 806, at serve time, if User A, who is a member of Group A, uses his or her credentials to request (via browser 532) either the URL http://host/portalpage?c=A or the URL http://host/portalpage?c=B, the web application server 520 returns HTTP Status Code 200 ("OK") and also returns the secure portal content element A 410 (FIG. 4), which is all of the content of the portal page 400 that members of Group A are authorized to view. Moreover, it should be noted that regardless of which unique URL, whether http://host/portalpage?c=A or http://host/portalpage?c=B, is requested by User A, because User A is an individual user and not a search engine, the web application server 520 will, by way of interface layer 522, return all of the content of the portal page 400 that members of Group A are authorized to view, which in this case is secure portal content element A 410.

At row 808, at serve time, if the search engine 512 (at step 612 in FIG. 6 and more particularly step 704 in FIG. 7) requests the URL http://host/portalpage?c=A using User A's credentials, the web application server 520 returns HTTP Status Code 200 ("OK") and also returns the secure portal content element A 410 (FIG. 4), since User A is a member of Group A and therefore has access to the secure portal content element A 410. In contrast, at row 810, at serve time, if the search engine 512 (at step 612 in FIG. 6 and more particularly step 704 in FIG. 7) requests the URL http://host/portalpage?c=B using User A's credentials, the web application server 520 returns HTTP Status Code 401 ("UNAUTHORIZED") because User A is a member of Group A and therefore does not have access to the secure portal content element B 420 (which is restricted to members of Group B).

At row 812, if, at serve time, User B, who is a member of Group B, uses his or her credentials to request either the URL http://host/portalpage?c=A or the URL http://host/portalpage?c=B, the web application server 520 returns HTTP Status Code 200 ("OK") and also returns the secure portal content element B 420, which is all of the content of the portal page 400 that members of Group B are authorized to view. As was the case with row 806, the web application server 520 will, via interface layer 522, return all of the content of the portal page 400 that members of Group B are authorized to view, regardless of which URL, http://host/portalpage?c=A or http://host/portalpage?c=B, is requested by User B. In this case, User B is only authorized to access secure portal content element B 420.

At row 814, if, at serve time, the search engine 512 (at step 612 in FIG. 6 and more particularly step 704 in FIG. 7) requests the URL http://host/portalpage?c=A using User B's credentials, the web application server 520 returns HTTP Status Code 401 ("UNAUTHORIZED") because User B is not a member of Group A and therefore does not have access to the secure portal content element A 410. However, at row 816, if at serve time the search engine 512 (at step 612 in FIG. 6 and more particularly step 704 in FIG. 7) requests the URL http://host/portalpage?c=B using User B's credentials, the web application server 520 returns HTTP Status Code 200 ("OK") and also returns the secure portal content element B 420, since User B is a member of Group B and therefore has access to the secure portal content element B 420 (FIG. 4).

At row 818, at serve time, if a User C, who is a member of both Group A and Group B, uses his or her credentials to request (via web browser 532) either the URL http://host/portalpage?c=A or the URL http://host/portalpage?c=B, the web application server 520 returns HTTP Status Code 200 ("OK") and, because User C is authorized to access both secure portal content element A 410 and secure portal content element B 420, the web application server 520 (FIG. 5) returns both of those secure portal content elements. Moreover, it should be noted that regardless of which URL, http://host/portalpage?c=A or http://host/portalpage?c=B, is requested by User C, the web application server 520 will, via interface layer 522, return all of the content of the portal page 400 that members of Group C are authorized to view, which in this case is both secure portal content element A 410 and secure portal content element B 420.

At row 820, if, at serve time, the search engine 512 (at step 612 in FIG. 6 and more particularly step 704 in FIG. 7) requests the URL http://host/portalpage?c=A using User C's credentials, the web application server 520 returns HTTP Status Code 200 ("OK"), and also returns the secure portal content element A 410 because User C is a member of Group A and therefore has access to the secure portal content element A 410. Similarly, at row 822, if at serve time the search engine 512 (at step 612 in FIG. 6 and more particularly step 704 in FIG. 7) requests the URL http://host/portalpage?c=B using User C's credentials, the web application server 520 also returns HTTP Status Code 200 ("OK") along with the secure portal content element B 420, since User C is a member of Group B and therefore has access to the secure portal content element B 420.

At row 824, if at serve time User D, who is not a member of Group A or a member of Group B, uses his or her credentials to request (via web browser 532) either the URL http://host/portalpage?c=A or the URL http://host/portalpage?c=B, the web application server 520 returns HTTP Status Code 401 ("UNAUTHORIZED"), as well as a page showing that access was denied, because User D is not authorized to see any of the portal content elements forming part of the portal page 400.

At row 826, if, at serve time, the search engine 512 (at step 612 in FIG. 6 and more particularly step 704 in FIG. 7) requests the URL http://host/portalpage?c=A using User D's credentials, the web application server 520 returns HTTP Status Code 401 ("UNAUTHORIZED") because User D is not a member of Group A and therefore does not have access to the secure portal content element A 410. Similarly, at row 828, if at serve time, the search engine 512 (at step 612 in FIG. 6 and more particularly step 704 in FIG. 7) requests the URL http://host/portalpage?c=B using User D's credentials, the server maintaining the portal page 400 (FIG. 4) returns HTTP Status Code 401 ("UNAUTHORIZED") because User D is not a member of Group B and therefore does not have access to the secure portal content element B 420 (FIG. 4).

Operation of aspects of the present invention will now be illustrated by way of examples, with reference to FIGS. 4, 5, 6, 7 and 8. For the purpose of the following illustrative examples, the exemplary embodiment of the method 600 is an embodiment in which URLs are used as the unique identifiers and in which the only secure portal content elements identified by the result identification set are those which the user is permitted to access. Thus, in the embodiment on which the following examples are based, any secure portal content elements that are members of the final result set but to which the user is denied access are omitted from the result identification that is presented to the user.

Example 1

The search engine 512 maintains a content index 514 (step 602 of the method 600), obtained either by crawling or from a feed. In the content index 514, each secure portal content element is associated with a unique URL (step 604 of the method 600). For secure portal content element A 410, the unique URL is http://host/portalpage?c=A; for secure portal content element B 420, the unique URL is http://host/portalpage?c=B.

User A, who has logged in using his or her credentials, performs a search by entering the string "employee" into the web browser 532 via personal computer 530. This search request is then received by the search engine 512 (step 606 of the method 600) along with the user's credentials (step 608 of the method 600). The search engine 512 uses its content index 514 to execute the search, and generates a preliminary result set (step 610 of the method 600) which includes secure portal content element A 410 in portal page 400 because the "employee" keyword 414 matches the search parameters. Other items, such as other secure portal content elements, non-secure portal content elements, or ordinary web pages, may also be included in the preliminary result set, depending on the content that was indexed.

For each secure portal content element in the preliminary result set, the search engine 512 uses User A's credentials, as well as the unique URL, to determine whether User A is permitted to access that secure portal content element (step 612 of the method 600). Therefore, for secure portal content element A 410, the search engine 512 uses User A's credentials to request the URL http://host/portalpage?c=A from the web application server 520 (step 704 of the method 700). This corresponds to the request shown at row 808 in FIG. 8. The request is received at the web application server 520 by the interface layer 522, which processes the request and, because the request came from a search engine, passes to portal server 524 a request only for the specific secure portal content element A 410. Because User A is a member of Group A and therefore has access to secure portal content element A 410, the portal server 524 returns HTTP Status Code 200 ("OK"), along with secure portal content element A 410 only. The HTTP Status Code 200 ("OK") and secure portal content element A 410 are then passed by the interface layer 522 to the search engine 512. Because access was granted (step 706 of the method 700), secure portal content element A 410 is recorded as being accessible to User A (step 708 of the method 700).

Because secure portal content element A 410 (FIG. 4) is recorded as being accessible to User A, if secure portal content element A 410 is included in the final result set (step 614 of the method 600), then it will also be included in the result identification presented to User A (step 616 of the method 600), which in this exemplary embodiment includes only those secure portal content elements that User A is permitted to access. Other results, such as web pages and non-secure portal content elements, may be included in the final result set and/or the result identification as well. If the result identification is presented to User A and User A selects the secure portal content element A 410 (FIG. 4), a request for the URL http://host/portalpage?c=A, using User A's credentials, is transmitted from the web browser 532 to the web application server 520. This request corresponds to row 806 in FIG. 8. At web application server 520, the request is received by the interface layer 522, which recognizes that the request is from a user rather than a search engine, and passes to portal server 524 a request for all portal content that User A is authorized to access. Portal server 524 returns HTTP Status Code 200 ("OK"), along with a portal page consisting of secure portal content element A 410, which is all of the content of the portal page 400 that User A is permitted to view. The interface layer 522 then passes HTTP Status Code 200 ("OK"), together with the portal page consisting of secure portal content element A 410, to the web browser 532 for viewing by the user.

Example 2

As was the case in Example 1, the search engine 512 maintains a content index 514 (step 602 of the method 600), within which each secure portal content element is associated with a unique URL (step 604 of the method 600). The URLs are http://host/portalpage?c=A for secure portal content element A 410 and http://host/portalpage?c=B for secure portal content element B 420.

Having logged in using his or her credentials, User A performs another search, this time by entering the string "income" into the web browser 532. This search request is then transmitted, together with User A's credentials, to the search engine 512 (steps 606 and 608 of the method 600). As before, the search engine 512 uses its content index 514 to execute the search, and generates a preliminary result set (step 610 of the method 600). This time, the preliminary result set includes secure portal content element B 420 because the "income" keyword 424 matches the search parameters. As was the case in Example 1, other items, such as other secure portal content elements, non-secure portal content elements, or ordinary web pages, may also be included in the preliminary result set, depending on the content that was indexed.

As was done in Example 1, for each secure portal content element in the preliminary result set, the search engine 512 uses the unique URL, along with User A's credentials, to determine whether User A is entitled to access that secure portal content element (step 612 of the method 600). Therefore, for secure portal content element B 420, the search engine uses User A's credentials to request the URL http://host/portalpage?c=B from the web application server 520 (step 704 of the method 700). This corresponds to the request shown at row 810 in FIG. 8. The interface layer 522 receives and processes the request and, because the request came from a search engine, passes a request only for the specific secure portal content element B 420 to portal server 524. Because User A is not a member of Group B, User A does not have access to secure portal content element B 420. Accordingly, the portal server 524 returns HTTP Status Code 401 ("UNAUTHORIZED") to the interface layer 522, which in turn passes the HTTP Status Code 401 ("UNAUTHORIZED") back to the search engine 512. Because access was denied (step 706 of the method 700), secure portal content element B 420 is recorded as being inaccessible to User A (step 710 of the method 700).

Because secure portal content element B 420 (FIG. 4) is recorded as being inaccessible to User A, even if secure portal content element B 420 (FIG. 4) is included in the final result set (step 614 of the method 600), it will not be included in the result identification presented to User A (step 616 of the method 600) because in this exemplary embodiment the result identification includes only those secure portal content elements that User A is permitted to access. (Of course, other items matching the search criteria and to which User A has access may be included in the final result set and/or the result identification.) Therefore, when the result identification is presented to User A, User A will not see a listing for secure portal content element B 420, even though it matches the search criteria, because User A does not have access to secure portal content element B 420. In alternate embodiments, secure portal content element B 420 might be included in the result identification but in such a way as to distinguish the fact that it is not accessible to User A.

Example 3

Like in Examples 1 and 2, the search engine 512 maintains a content index 514 (step 602 of the method 600). The content index 514 associates each secure portal content element with a unique URL (step 604 of the method 600), namely http://host/portalpage?c=A for secure portal content element A 410 and http://host/portalpage?c=B for secure portal content element B 420.

In this example User C logs in using his or her credentials, and performs a search by entering the string "resume" into the web browser 532. This search request is then transmitted, along with the credentials for User C, to the search engine 512 (steps 606 and 608 of the method 600). As in Examples 1 and 2, the search engine 512 carries out the search using content index 514 and generates a preliminary result set (step 610 of the method 600). The preliminary result set includes secure portal content element A 410 because the "resume" keyword 414 is a match for the search parameters entered by User C. As with Examples 1 and 2, other items, such as other secure portal content elements, non-secure portal content elements, or ordinary web pages, may also be included in the preliminary result set, depending on the content that was indexed.

Analogously to Examples 1 and 2, for each secure portal content element in the preliminary result set, the search engine 512 will use User C's credentials, together with the unique URL, to determine whether User C is entitled to access that secure portal content element (step 612 of the method 600). Accordingly, for secure portal content element A 410, the search engine uses User C's credentials to request the URL http://host/portalpage?c=A from the web application server 520 (step 704 of the method 700). This corresponds to the request shown at row 820 in FIG. 8. The interface layer 522 receives and processes the request and, since the request was made by a search engine, passes a request only for the specific secure portal content element A 410 to portal server 524. Because User C is a member of Group A and therefore has access to secure portal content element A 410, the portal server 524 returns HTTP Status Code 200 ("OK"), along with secure portal content element A 410 only. The interface layer 522 then passes HTTP Status Code 200 ("OK") and the secure portal content element A 410 to the search engine 512. Because access was granted (step 706 of the method 700), the secure portal content element A 410 is recorded as being accessible to User C (step 708 of the method 700).

Because the search engine 512 has recorded the secure portal content element A 410 (FIG. 4) as being accessible to User C, if the secure portal content element A 410 is included in the final result set (step 614 of the method 600), it will also be included in the result identification presented to User C (step 616 of the method 600), which in this exemplary embodiment includes only those secure portal content elements that User C is permitted to access. (Other results may also be included in the final result set and/or the result identification as well.) Upon presentation of the result identification to User C, if User C selects the secure portal content element A 410, a request for the URL http://host/portalpage?c=A, using User C's credentials, is sent to the web application server 520 from the web browser 532. This request corresponds to row 818 FIG. 8. At web application server 520, the interface layer 522 receives the request and recognizes that the request is from a user rather than a search engine. The interface layer 522 therefore passes a request for all portal content in the portal page of which the secure portal content element A 410 is a part (namely portal page 400), and which User C is authorized to access, to portal server 524. Because User C is a member of both Group A and Group B, User C is permitted to access both secure portal content element A 410 and secure portal content element B 420. Accordingly, portal server 524 returns HTTP Status Code 200 ("OK"), along with a portal page including both secure portal content element A 410 and secure portal content element B 420, which is all of the content of the portal page 400 that User C is permitted to view. The interface layer 522 then passes HTTP Status Code 200 ("OK"), together with the portal page containing both secure portal content element A 410 and secure portal content element B 420, to the web browser 532 so that User C can view the page.

In the illustrative embodiments and examples described above, a unique URL has been used as the unique identifier for individual secure portal content elements. One skilled in the art, now informed by the disclosure herein, will appreciate that other types of unique identifiers may also be used. For example, a single URL identifying a portal (or a portal page) as a whole could be used in conjunction with a numeric, alphabetic or alphanumeric code (which may also include symbolic characters) that is unique with respect to that portal. Thus, a portal might be identified by the URL http://host/portalpage and individual secure portal content elements could be identified by codes such as "A1", "A2", "B1", "B2", and the like. To check a user's access to a particular secure portal content element (such as at step 612 in the method 600), a search engine (such as search engine 512) could request the URL for the portal as a whole and transmit the unique code for the secure portal content element as suitably formatted POST data. An interface layer (such as interface layer 522) on a web server (such as web application server 520) would be adapted to interpret the POST data and direct an appropriate request to the portal server (such as portal server 524).

In addition, it will be appreciated that in cases where a portal includes both secure and non-secure portal content elements, when a web application server receives a request from a user for a particular secure portal content element that the user is authorized to access, the web server will preferably return a portal page including not only all secure portal content elements that the user is authorized to access, but also all appropriate non-secure portal content elements as well.

Moreover, while the illustrative embodiment shown in FIG. 5 depicts a particular arrangement that is suitable for implementation of the present invention, other arrangements may equally be used without departing from the scope of the present invention. For example, the interface layer 522 and portal server 524 may be integrated into a single software program, or the search engine 512, interface layer 522 and portal server 524 may all be running on the same computer system. Other modifications may also be made.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method for searching content of a portal comprising:
providing the portal comprising at least one portal page having a plurality of portal content elements at least one of which is a secure portal content element wherein each of the portal content elements is a portion of a portal page;
associating each secure portal content element with a unique identifier, wherein the unique identifier is a uniform resource locator and is different than a uniform resource locator for the portal page;
indexing each secure portal content element by a keyword;
receiving search parameters and credentials from a user;
generating a preliminary result set satisfying the search parameters and including at least one of the secure portal content elements indexed by keyword and associated with the unique identifier;
for each secure portal content element included in the preliminary result set, using the credentials and the unique identifier for that secure portal content element to determine whether the user is permitted to access that secure portal content element;
responsive to determining, for each secure portal content element included in the preliminary result set, whether the user is permitted to access that secure portal content element, using the preliminary result set to generate a final result set satisfying the search criteria and including at least one secure portal content element; and
presenting to the user a result identification identifying the secure portal content elements that are included in the final result set and which the user is permitted to access, wherein the result identification distinguishes all secure portal content elements that are included in the final result set and which the user is permitted to access, from any secure portal content elements that are included in the final result set and to which the user is denied access.

2. The method of claim 1, wherein the only secure portal content elements that are identified by the result identification are those which the user is permitted to access.

3. The method of claim 1, wherein the result identification comprises a first identifiable subset identifying all secure portal content elements that are included in the final result set and which the user is permitted to access and a second identifiable subset that identifies all secure portal elements that are included in the final result set and to which the user is denied access.

4. The method of claim 3, wherein members of each subset are identified by flagging.

5. The method of claim 3, wherein the first subset is presented to the user as a first result group and the second subset is presented to the user as a second result group.

6. The method of claim 1, further comprising the step of:
responsive to a selection by the user of a secure portal content element in the final result set, presenting to the user a portal page with which the selected secure portal content element is associated, wherein the portal page includes all portal content elements for that portal page that the user is permitted to access.

7. The method of claim 1 further comprising the step of maintaining, at least one content index for content in the portal content elements.

8. A data processing system for searching content of a portal comprising a bus system; a communications unit coupled to the bus system; a memory coupled to the bus system, wherein the memory includes a set of instructions; and a processing unit coupled to the bus system, wherein the processing unit performs execution of the set of instructions to perform the following steps:

provide the portal comprising at least one portal page having a plurality of portal content elements at least one of which is a secure portal content element wherein each of the portal content elements is a portion of a portal page;

associate each secure portal content element with a unique identifier, wherein the unique identifier is a uniform resource locator and is different than a uniform resource locator for the portal page;

index each secure portal content element by a keyword;

receive search parameters and credentials from a user;

generate a preliminary result set satisfying the search parameters and including at least one of the secure portal content elements indexed by keyword and associated with the unique identifier;

for each secure portal content element included in the preliminary result set, use the credentials and the unique identifier for that secure portal content element to determine whether the user is permitted to access that secure portal content element;

responsive to determining, for each secure portal content element included in the preliminary result set, whether the user is permitted to access that secure portal content element, use the preliminary result set to generate a final result set satisfying tile search criteria and including at least one secure portal content element; and present to the user a result identification identifying the secure portal content elements that are included in the final result set and which the user is permitted to access, wherein the result identification distinguishes all secure portal content elements that are included in the final result set and which the user is permitted to access, from any secure portal content elements that are included in the final result set and to which the user is denied access.

9. The data processing system of claim 8, wherein the only secure portal content elements that are identified by the result identification are those which the user is permitted to access.

10. The data processing system of claim 8, wherein the result identification comprises a first identifiable subset identifying all secure portal content elements that are included in the final result set and which the user is permitted to access and a second identifiable subset that identifies all secure portal elements that are included in the final result set and to which the user is denied access.

11. The data processing system of claim 10, wherein members of each subset are identified by flagging.

12. The data processing system of claim 10, wherein each the first subset is presented to the user as a first result group and the second subset is presented to the user as a second result group.

13. The data processing system of claim 8, wherein the processing unit performs execution of the set of instructions to perform the following further step:

responsive to a selection by the user of a secure portal content element in the final result set, present to the user a portal page with which the selected secure portal content element is associated, wherein the portal page includes all portal content elements for that portal page that the user is permitted to access.

14. A computer program product comprising at least one computer-readable medium containing computer-usable instructions for searching content of a portal comprising wherein the instructions, when executed, cause a computer to:

provide the portal comprising at least one portal page having a plurality of portal content elements at least one of which is a secure portal content element wherein each of the portal content elements is a portion of a portal page;

associate each secure portal content element with a unique identifier, wherein the unique identifier is a uniform resource locator and is different than a uniform resource locator for the portal page;

index each secure portal content element by a keyword;

receive search parameters and credentials from a user;

generate a preliminary result set satisfying the search parameters and including at least one of the secure portal content elements indexed by keyword and associated with the unique identifier:

for each secure portal content element included in the preliminary result set, use the credentials and the unique identifier for that secure portal content element to determine whether the user is permitted to access that secure portal content element;

responsive to determining, for each secure portal content element included in the preliminary result set, whether the user is permitted to access that secure portal content element, use the preliminary result set to generate a final result set satisfying the search criteria and including at least one secure portal content element; and present to the user a result identification identifying the secure portal content elements that are included in the final result set and which the user is permitted to access, wherein the result identification distinguishes all secure portal content elements that are included in the final result set and which the user is permitted to access, from any secure portal content elements that are included in the final result set and to which the user is denied access.

15. The computer program product of claim 14, wherein the only secure portal content elements that are identified by the result identification are those which the user is permitted to access.

16. The computer program product of claim 14, wherein the result identification comprises a first identifiable subset identifying all secure portal content elements that are included in the final result set and which the user is permitted to access and a second identifiable subset that identifies all secure portal elements that are included in the final result set and to which the user is denied access.

17. The computer program product of claim 16, wherein members of each subset are identified by flagging.

18. The computer program product of claim 16, wherein the first subset is presented to the user as a first result group and the second subset is presented to the user as a second subset.

19. The computer program product of claim 14, wherein the computer-readable medium contains further computer-usable instructions which, when executed, cause a computer to further:

responsive to a selection by the user of a secure portal content element in the final result set, present to the user a portal page with which the selected secure portal content element is associated, wherein the portal page includes all portal content elements for that portal page that the user is permitted to access.

20. The computer program product of claim 14, wherein the computer-readable medium contains further computer-usable instructions which, when executed, cause a computer to further maintain at least one content index tbr content in the portal content elements.

* * * * *